(12) United States Patent
Zhu

(10) Patent No.: US 10,845,679 B2
(45) Date of Patent: Nov. 24, 2020

(54) QUICK CONNECTION HANDLE FOR PHOTOGRAPHIC EQUIPMENT AND PHOTOGRAPHIC EQUIPMENT ASSEMBLY

(71) Applicant: ZHONGSHAN DASHAN PHOTOGRAPHIC EQUIPMENT CO., LTD., Zhongshan (CN)

(72) Inventor: Xihua Zhu, Zhongshan (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 0 days.

(21) Appl. No.: 16/663,394

(22) Filed: Oct. 25, 2019

(65) Prior Publication Data

US 2020/0081325 A1    Mar. 12, 2020

Related U.S. Application Data

(63) Continuation of application No. PCT/CN2018/111287, filed on Oct. 22, 2018.

(30) Foreign Application Priority Data

Sep. 12, 2018 (CN) .......................... 2018 1 1063764

(51) Int. Cl.
*G03B 17/56* (2006.01)
*F16M 11/04* (2006.01)

(52) U.S. Cl.
CPC ......... *G03B 17/561* (2013.01); *F16M 11/041* (2013.01)

(58) Field of Classification Search
CPC ..... G03B 17/561; F16M 11/16; F16M 11/041
See application file for complete search history.

(56) References Cited

U.S. PATENT DOCUMENTS

2008/0267613 A1* 10/2008 Darrow ................ F16M 11/36
396/428

FOREIGN PATENT DOCUMENTS

| CN | 1477442 A | * | 2/2004 | |
|---|---|---|---|---|
| CN | 1477442 A | | 2/2004 | |
| CN | 107816609 A | * | 3/2018 | ............. F16M 11/16 |
| CN | 107816609 A | | 3/2018 | |
| EP | 0702192 A1 | | 3/1996 | |
| TW | 461946 B | | 1/2001 | |

* cited by examiner

*Primary Examiner* — Minh Q Phan

(57) ABSTRACT

The present invention relates to a quick connection handle for photographic equipment comprising a mounting base, a locking component provided in the mounting base and a connecting base connected to the mount base; and the locking component is movable in the mounting base, a through hole is provided in the mounting base through which a screw bolt having an external thread passes, the locking component comprises a locking block, a spring abutting against the locking block and a button, the spring and the button urge the locking block towards different directions, a locking chamber is in the locking block communicating with the through hole of the mounting base, and the locking chamber comprises an internal thread section and a non-threaded section locating at opposite sides, and the spring abuts against an end of the locking block adjacent to the internal thread section.

14 Claims, 11 Drawing Sheets

QUICK CONNECTION HANDLE FOR PHOTOGRAPHIC EQUIPMENT AND PHOTOGRAPHIC EQUIPMENT ASSEMBLY

TECHNICAL HELD

The present invention relates to the field of photography, video recording, and more particularly to a quick connection handle for photographic equipment and a photographic equipment assembly.

BACKGROUND

With developments in technology and improvements in people's living standards, image capturing devices and cameras have become more and more popular. Currently, when video shooting with a camcorder or DSLR, it requires to mount to a stable support or a tripod. The conventional camera tripod has a bowl which is used to adjust shooting angle and orientation. However, in the prior art, a rotary handle and a screw are employed to adjust the bowl head angle and orientation. Since the rotary handle has a long rotation thread counts, it often requires a long time to assemble and dissemble the rotary handle, which thereby causing a delay in adjustment time for the shooting angle or orientation, and even miss the opportunity to capture the crucial moment of a photo or a video.

SUMMARY

The main objective of the present invention is to provide a quick connection handle for photographic equipment which overcomes the above shortcomings.

The present invention provides a quick connection handle for photographic equipment comprising a mounting base, a locking component provided in the mounting base and a connecting base connected to the mount base; and the locking component is movable in the mounting base, a through hole is provided in a center of the mounting base through which a screw bolt having an external thread passes, the locking component comprises a locking block, a spring abutting against the locking block and a button, the spring is configured to urge the locking block towards a first direction and the button is configured to urge the locking block towards a second direction opposite to the first direction, a locking chamber is provided in the locking block communicating with the through hole of the mounting base, and the locking chamber comprises an internal thread section and a non-threaded section which locate at opposite sides, and the spring abuts against an end of the locking block adjacent to the internal thread section.

In some embodiments, a cross-section of the locking chamber transverse to its extending direction is substantial D shaped.

In some embodiments, an inner diameter of the internal thread section is less than a width of the non-threaded section measured in a direction transverse to an extending direction of the locking chamber.

In some embodiments, axes of the locking block, the spring and the button are substantially parallel to each other.

In some embodiments, a height of the thread of the internal thread section gradually decreases to the non-threaded section.

In some embodiments, a side wall of the internal thread section is arc-shaped with a central angle not more than 180°.

In some embodiments, the mounting base comprises a first limit portion for accommodating the locking block, a second limit portion for receiving the button and a third limit portion for installing the spring.

In some embodiments, the locking block is provided with a receiving groove at one end for receiving the spring.

In some embodiments, the locking block is provided with a fixing portion at one side for fastening the button.

The present invention also provides a photographic equipment assembly comprising a camera stand comprising a bowl base, a bowl placed on the bowl base, and the above quick connection handle.

The present invention has the following beneficial effects compared with the prior art. The present invention provides a quick connection handle which is convenient to assemble and disassemble, the spring of the locking component is connected to an end of the locking block having an internal thread of a locking block, and the button is connected to the other end of the locking block, the quick connection handle can be rapidly mounted on a screw bolt of a howl without pressing the button, and the handle can also be rapidly detached from a camera stand via the cooperation of the locking block, the spring and the button, such that it is more convenient for a user to operate the quick connection handle. Therefore, the structure according to the present invention is more reasonable, which is time saving and reduces effort when it is used to lock the bowl.

BRIEF DESCRIPTION OF THE DRAWINGS

The further features of the present invention will be apparent from the descriptions of the preferred embodiments which are only provided by means of examples in conjunction with accompanying drawings, wherein.

DESCRIPTION OF THE EMBODIMENTS

The present invention will be further described in detail with reference to the accompanying drawings and embodiments so that the objective and the advantages of the present invention will be more apparent.

Figure 1:
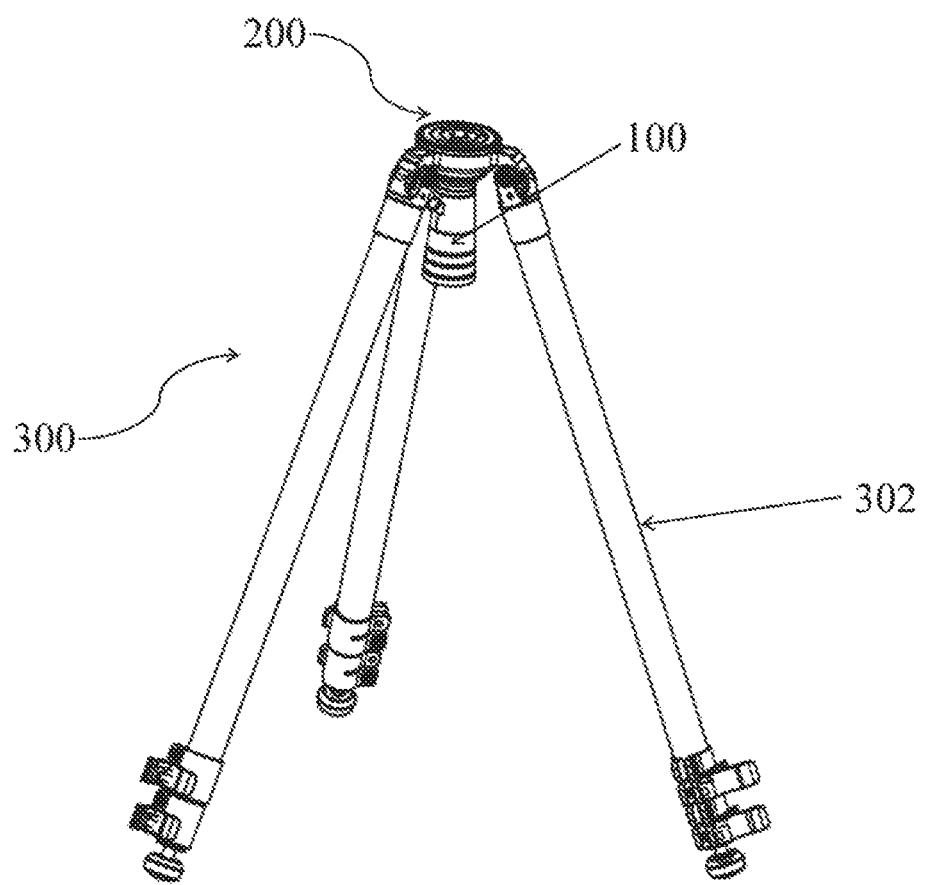
FIG. 1 is a schematic view of a photographic equipment assembly comprising a quick connection handle according to the present invention.
Figure 2:
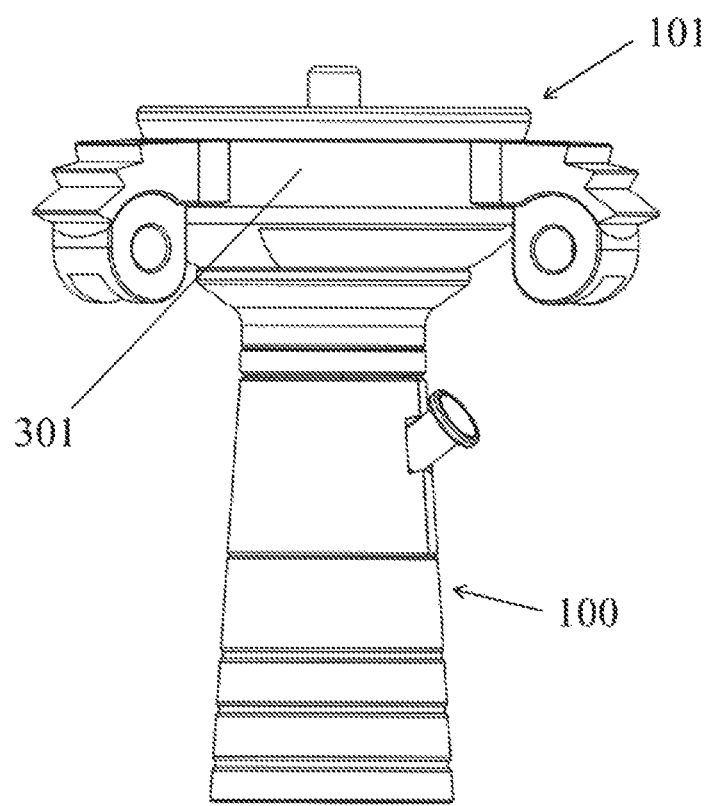
FIG. 2 is a schematic view of a bowl together with a quick connection handle according to the present invention.
Figure 3:
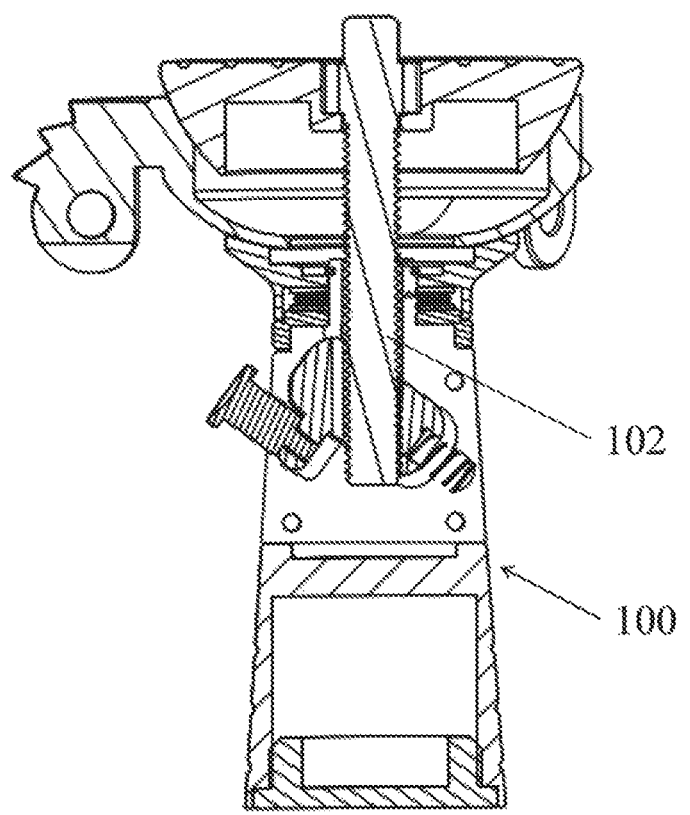
FIG. 3 is a cross sectional view of the bowl with the quick connection handle shown in FIG. 2.

As shown in FIGS. 1 to 3, a photographic equipment assembly 300 according to the present invention includes a camera stand 302, a bowl 101 and a quick connection handle 100. The camera stand 302 includes a bowl base 301 for placing the bowl 101. The quick connection handle 100 is provided on a side of the bowl base 301 opposite to the bowl 101, to fasten the bowl 101 by cooperating with a screw bolt 102 having an external thread. The camera stand 302, the bowl 101 and the screw bolt 102 can be the same as or similar to those in the prior art, so it will not be discussed in detail here.

Figure 4:
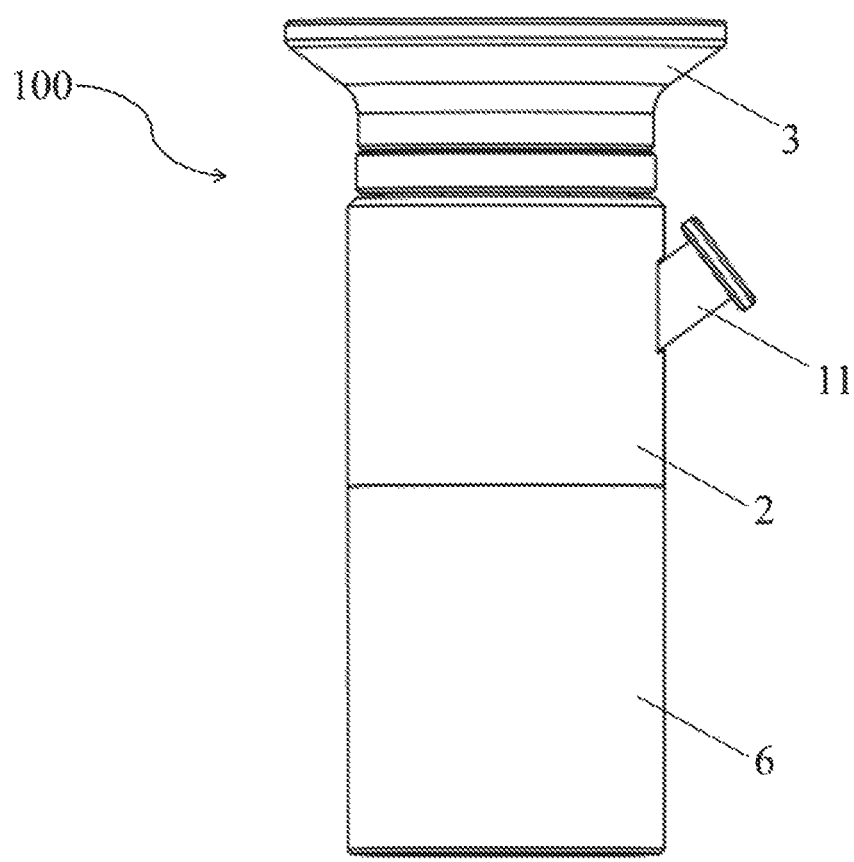
FIG. 4 is a schematic view of an embodiment of a quick connection handle according to the present invention.
Figure 5:
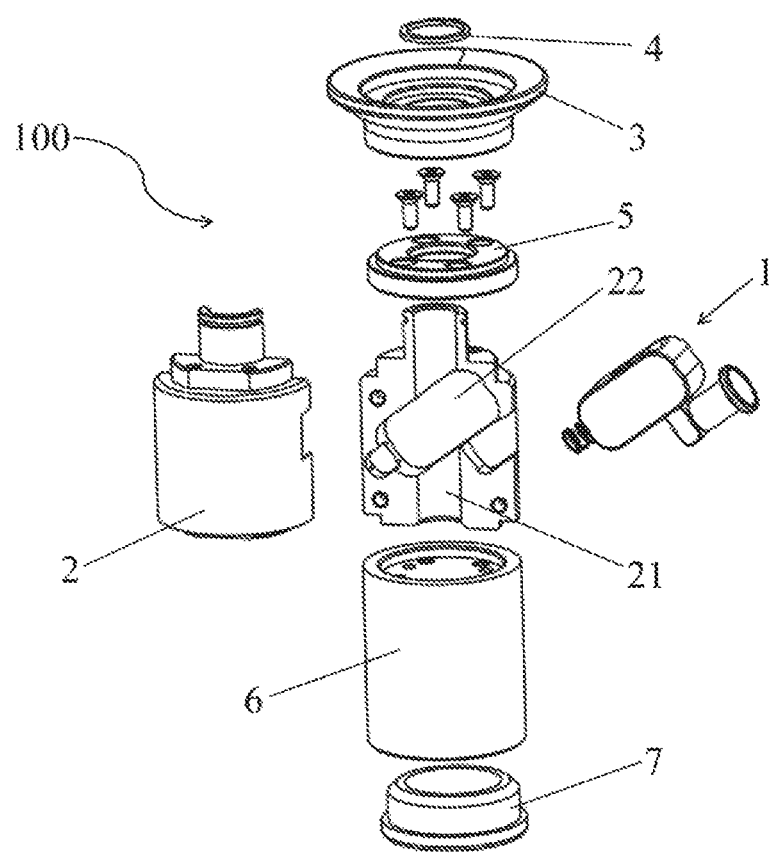
FIG. 5 is an exploded view of the quick connection handle shown in FIG. 4.
Figure 6:
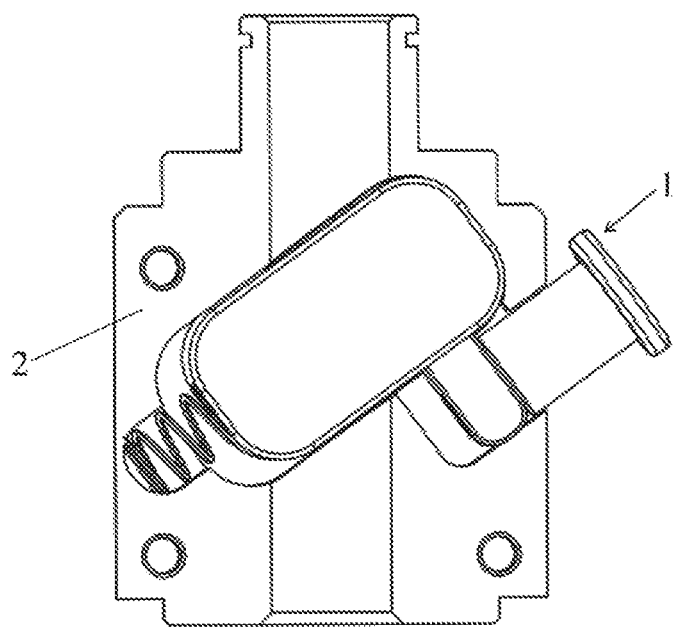
FIG. 6 is a schematic view of a mounting base equipped with a locking component of the quick connection handle shown in FIG. 4.

As shown in FIGS. 4 to 6, the quick connection handle 100 provided by the present invention includes a mounting base 2, a locking component 1 provided in the mount base 2 and a connecting base 3 connected to the mount base 2. The mount base 2 includes two parts which detachably connect with each other. In this embodiment, the two parts are symmetrical in structure. The locking component 1 is directly mounted within the mount base 2. An end of the connection base 3 adjacent to the bowl base 301 is provided as a curved surface matching the shape of the bowl base 301 so that the bowl 101 can be precisely positioned and fastened in any required angle or orientation during using the quick connection handle 100.

In this embodiment, in order to fix the connecting base 3 onto the mounting base 2, a clamp 4 is provided on an end of the mount base 2 adjacent to the connection base 3, which not only stops the connecting base 3, but also fastens the two parts of the mount base 2 together.

Figure 7:
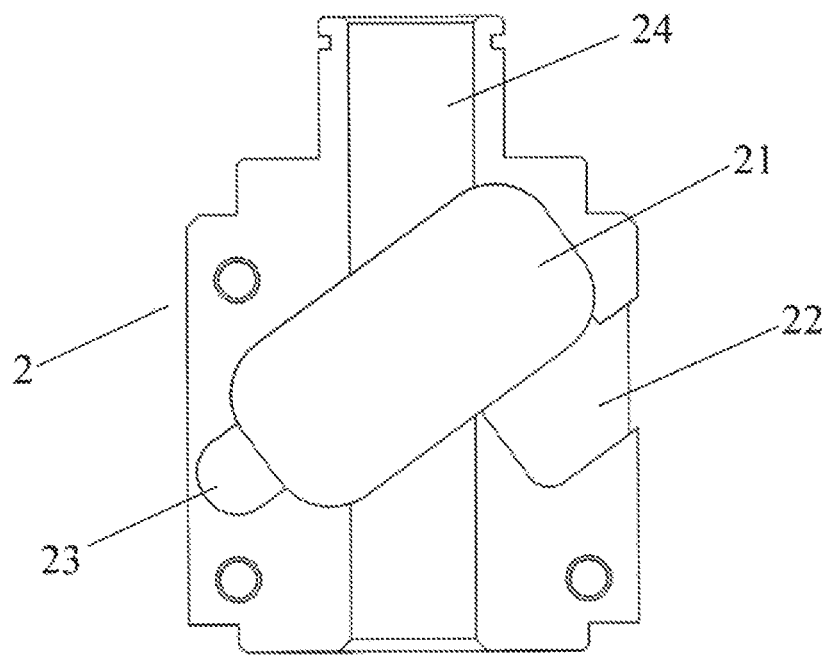
FIG. 7 is a schematic view of a mounting base of the quick connection handle shown in FIG. 4.
Figure 8:
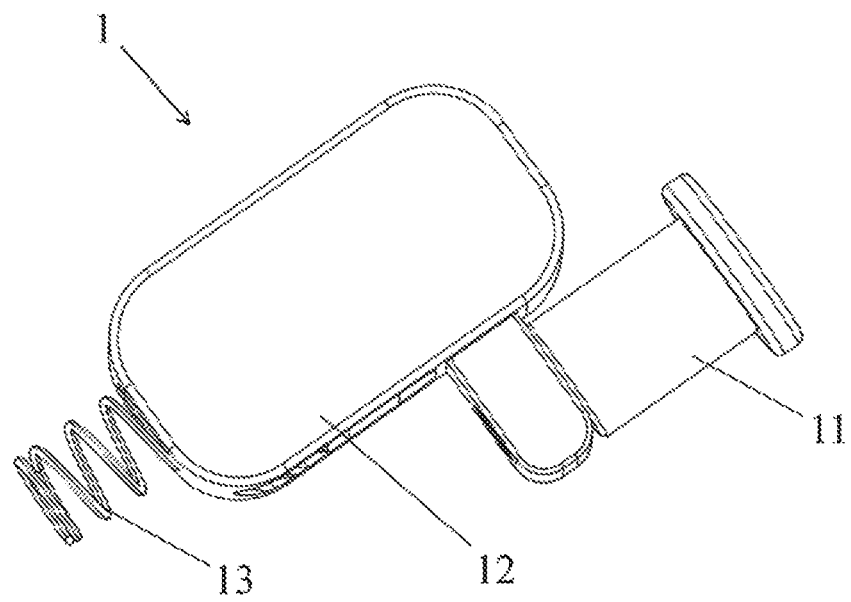
FIG. 8 is a schematic view of a locking component of the quick connection handle shown in FIG. 4.

As shown in FIGS. 6 to 8, the locking component 1 includes a locking block 12, a spring 13 connected to an end of the locking block 12 and a button 11 connected to the other end of the locking block 12. Axes of the locking block 12, the spring 13 and the button 11 are respectively substantially parallel to an axis of the locking component 1. In order to movably mount the locking component 1 in the mount base 2, the mount base 2 includes a first limit portion 21 for accommodating the locking block 12, a second limit portion 22 for receiving the button 11 and a third limit portion 23 for installing the spring 13, wherein a dimension of the first limit portion 21 in the axial direction of the locking block 12 is greater or slightly greater than a dimension of the locking block 12 in the same direction so that the locking block 12 can move along the direction. Moreover, the mount base 2 also includes a through hole 24 through which the screw bolt 102 passes. Preferably, the axial direction of the first limit portion 21 extends downward in respect to the axis of the through hole 24. Preferably, the diameter of the through hole 24 is slightly greater than that of the screw bolt 102 so that the screw bolt 102 can pass through the through hole 24 freely.

Figure 9:
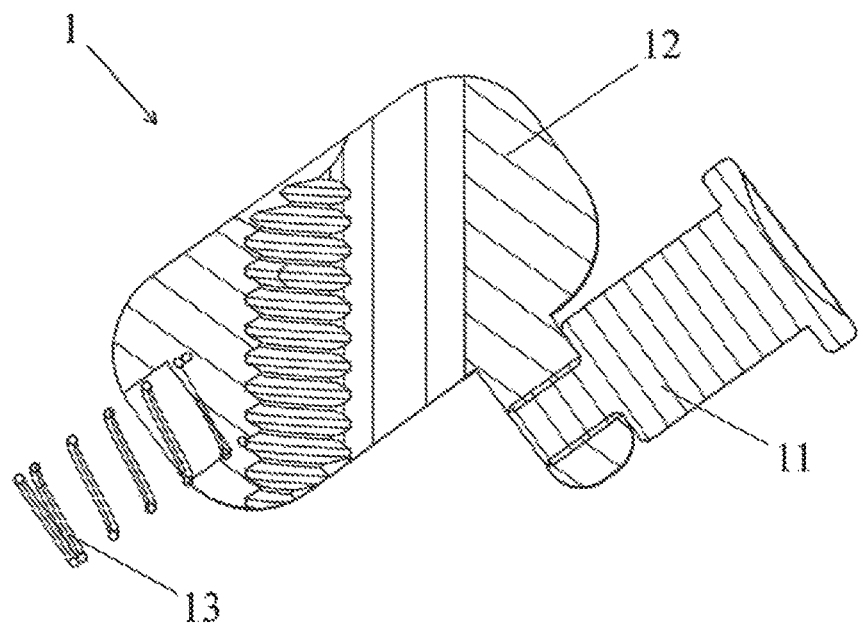
FIG. 9 is a cross sectional view of the locking component shown in FIG. 8.
Figure 10:
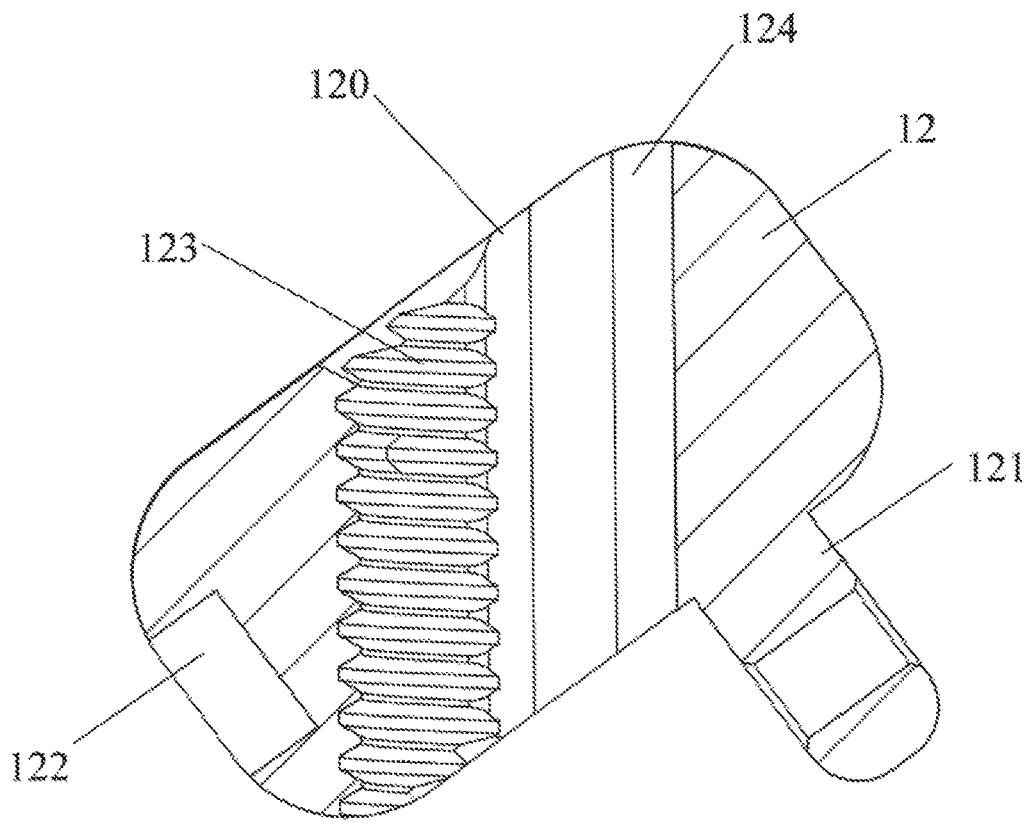
FIG. 10 is a cross sectional view of a locking block of the locking component as shown in FIG. 8.
Figure 11:
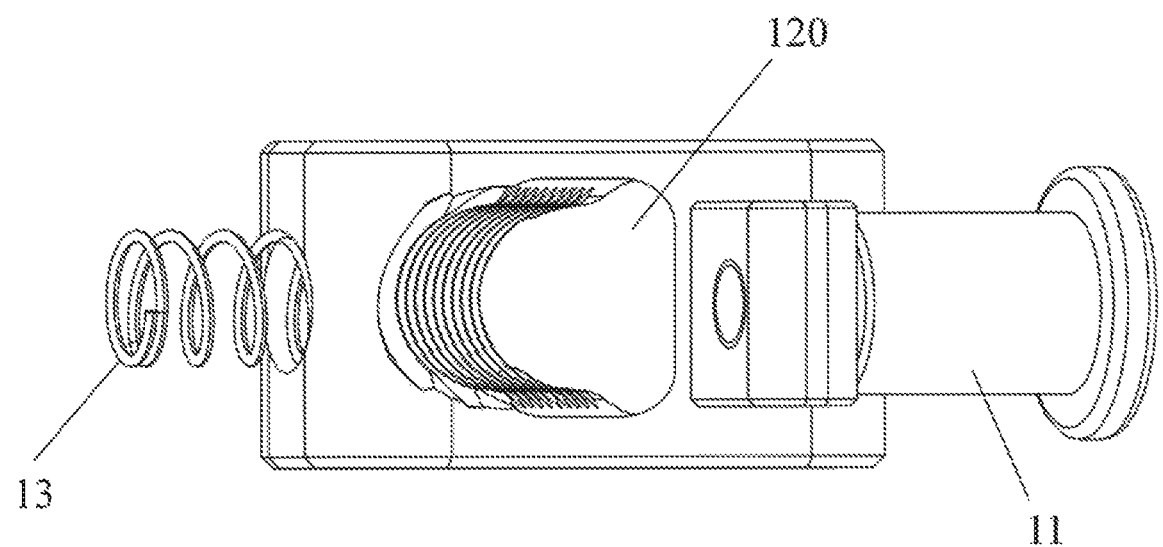
FIG. 11 is a schematic view of the locking component shown in FIG. 8.

FIGS. 9 to 11 respectively shows a cross sectional view of the locking component 1, a cross sectional view of the locking block 12 and a view of the locking component 1 in a different direction, for clearly understanding the structure of the locking component 1. The locking block 12 is provided with a receiving groove 122 at the bottom, a locking chamber 120 in a middle portion, and a fixing portion 121 at a lower side for fastening the button 11. An end of the spring 13 is received in the receiving groove 122 of the locking block 12 in order to provide a reliable connection between the spring 13 and the locking block 12. In addition, the receiving groove 122 also reduces the weight of the quick connection handle 100. The locking chamber 120 substantially extends along a direction parallel to the axis of the through hole 24, and has a width transverse to its extending direction greater than the diameter of the through hole 24. The locking chamber 120 includes an internal thread section 123 and a non-threaded section 124 opposite to each other, and an inner diameter of the internal thread section 123 is smaller than a width of the non-threaded section 124 measured in a direction transverse to the extending direction of the locking chamber 120. In this embodiment, the inner diameter of the internal thread section 123 is smaller than the inner diameter of the non-threaded section 124. As shown in FIG. 11, the cross-section of the locking chamber 120 transverse to its extending direction is substantial D shaped, and the width of the non-threaded section 124 is greater than the inner diameter of the internal thread section 123. Preferably, the height of the thread of the internal thread section 123 gradually decreases to the non-threaded section 124 so that the locking block 12 is smoothly connected to the screw bolt 102 in use. The side wall of the internal thread section 123 is arc-shaped with a central angle not more than 180°, preferably the side wall is semicircular. The non-threaded section 124 provides a space through which the screw bolt 102 passes. Preferably, the locking block 12 and the spring 13 are inclined with respect to the axis of the through hole 24.

Figure 12:
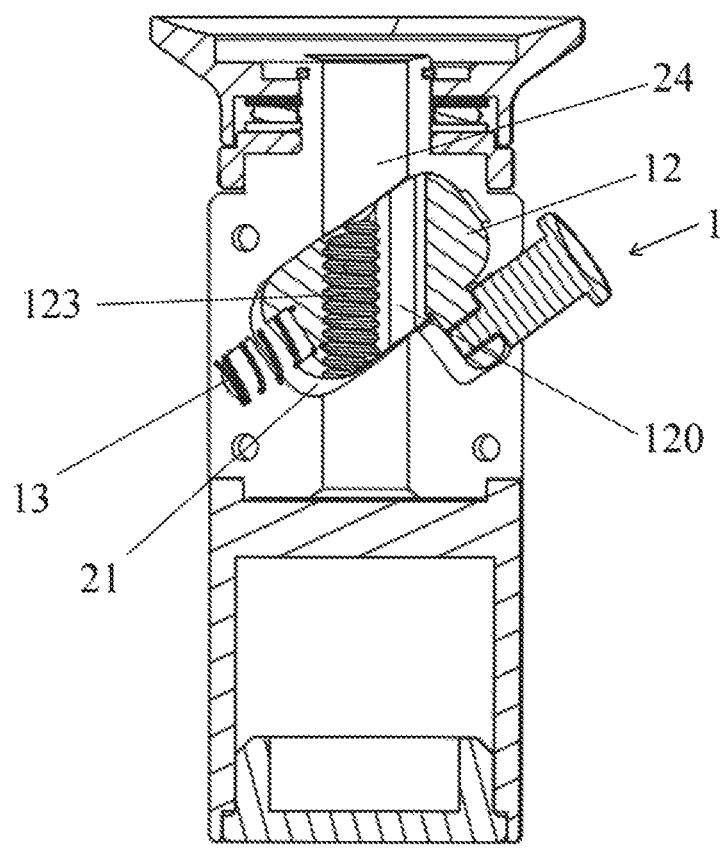
FIG. 12 is a cross sectional view of the quick connection handle shown in FIG. 4.
Figure 13:
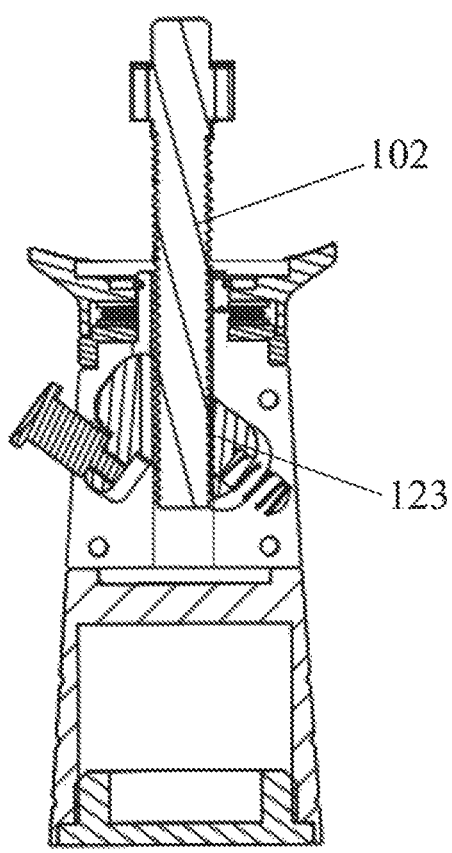
FIG. 13 is a cross sectional view of the quick connection handle shown in FIG. 4 connected with a screw bolt.

As shown in FIG. 12, before the quick connection handle 100 is connected to the screw bolt 102 of the photographic equipment assembly 300, the locking block 12 abuts against the top end of the first limit portion 21 under the action of the spring 13, and the internal thread section 123 of the locking chamber 120 offsets from the side wall of the through hole 24. As shown in FIG. 13, when the quick connection handle 100 has been mounted on the screw bolt 102, the internal thread section 123 is engaged with the thread of the screw bolt 102.

Figure 14:
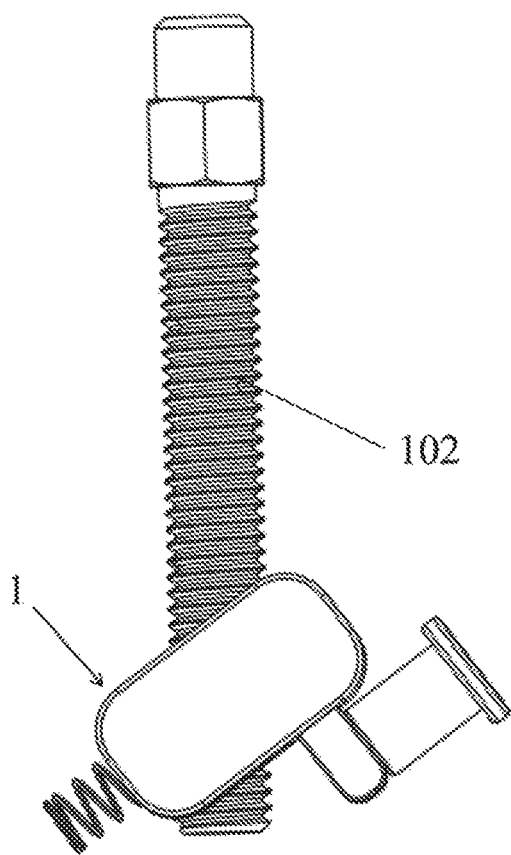
FIG. 14 is a schematic view of a locking component of the quick connection handle shown in FIG. 4 connected with a screw bolt.
Figure 15:
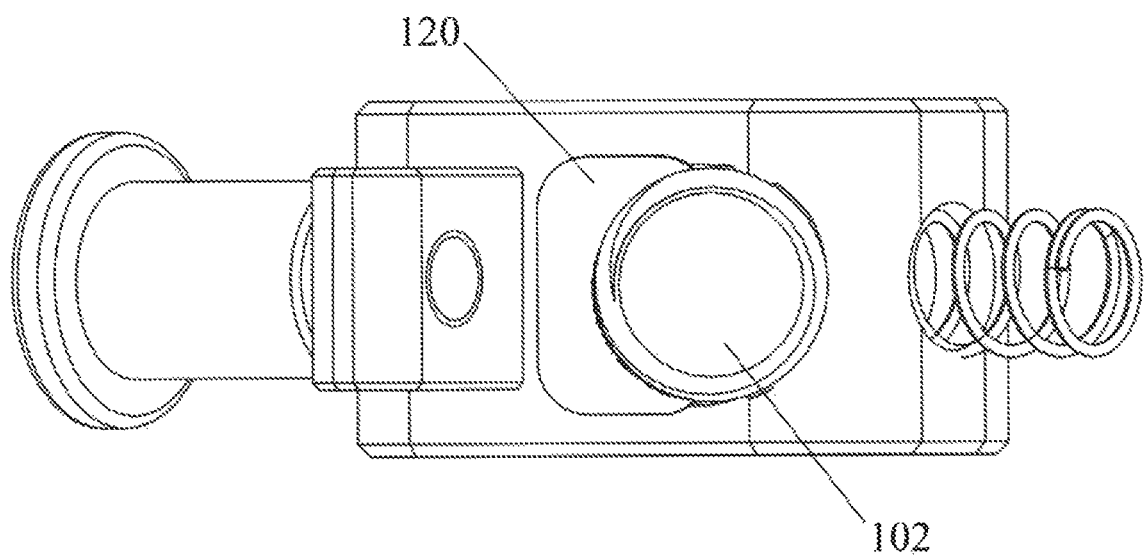
FIG. 15 is another schematic view of a locking component of the quick connection handle shown in FIG. 4 connected with a screw bolt.
Figure 16:
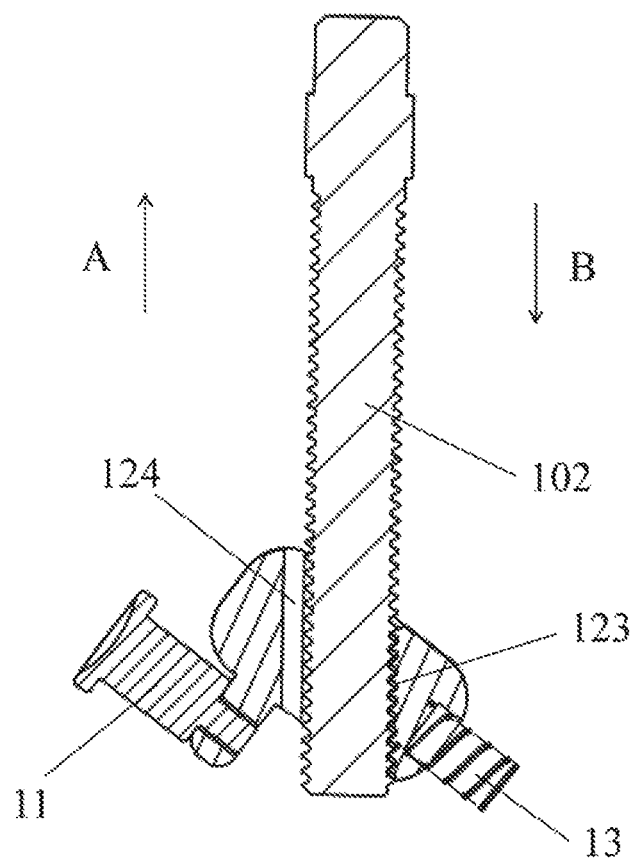
FIG. 16 is a cross sectional view of the locking component connected with the screw bolt shown in FIG. 14.

FIGS. 14 to 16 illustrate the assembly and disassembly of the locking component 1 and the screw bolt 102, for further explaining the operating principle of the quick connection handle 100. When the quick connection handle 100 is connected to the screw bolt 102 along a direction A by means of inserting, the quick connection handle 100 moves along the direction A, and threaded surfaces of the external thread of the screw bolt 102 exert a force perpendicularly to threaded surfaces of the internal thread of the internal thread section 123, preferably force is parallel to the axis of the locking block 12 so that the locking block 12 moves along its axis under the force and compresses the spring 13. Therefore, when mounting the quick connection handle 100 to the photographic equipment assembly 300, an operator can push the quick connection handle 100 onto the screw bolt 102 to achieve connection without pressing the button 11. It can be appreciated that the force may be nonparallel to the axis of the locking block 12, in that case, the connection can also be achieved without pressing the button as long as a component of the force along the axis of the locking block 12 is greater than a resultant force of the spring force and a frictional force on the threaded surfaces. It is greatly convenient for a user to operate this apparatus since the quick connection handle 100 is directly connected to the screw bolt 102 by means of inserting to realize connection. In order to further fasten the bowl 101, it is only required to rotate the quick connection handle 100 slightly and then the interstice between the handle and the screw bolt 102 will be eliminated, thereby the quick connection handle 100 and the screw bolt 102 are locked with each other to realize a fixation and a location of the bowl 101.

When the quick connection handle 100 is pulled down along a detached direction B after the quick connection handle 100 has been connected to the screw bolt 102, without an operation of the button 11 the quick connection handle 100 has a trend to move along the direction B, and the threaded surfaces of the external thread of the screw bolt 102 exert a force perpendicularly to lower threaded surfaces of the internal thread of the internal thread section 123. However, since the spring force cannot be offset by the force, disassembly of the quick connection handle 100 from the screw bolt 102 by just pulling the quick connection handle 100 is prevented. Therefore, to detach the quick connection handle 100, it is necessary to press the button 11 to disengage the engagement between the screw bolt 102 and the internal thread section 123 of the locking block, so that the locking block 12 moves and the non-threaded section 124 moves towards to the screw bolt 102, and then the quick connection handle 100 can be detached from the screw bolt 102. Specifically, the quick connection handle 100 can be detached in the following processes: slightly rotating the quick connection handle 100 to disengage the locking between the quick connection handle 100 and the screw bolt 102, and then pressing the button 11 to release the quick connection handle 100 from the screw bolt 102. While there is only a need to adjust the orientation of the bowl, the user only needs to rotate the quick connection handle 100 slightly to disengage the locking with the screw bolt 102 to realize an adjustment of the orientation of the bowl, and after the bowl is adjusted to a desirable position and orientation, the user can slightly rotate the quick connection handle 100 in an opposite direction to realize the fixing of the bowl again.

The quick connection handle 100 may includes a handle portion 6 for convenient operation of the user. Preferably, the handle portion 6 is hollow to reduce the weight of the quick connection handle 100. The handle portion 6 may also includes a bottom cover 7 provided at the bottom end, and preferably, the bottom cover 7 is fixed to the handle portion 6 by snap fit. This design not only reduces the weight, but also significantly facilitates to assembling of the quick connection handle 100.

Moreover, for enhancing the user experience, the profile of the quick connection handle 100 is preferably conical. Alternatively, a plurality of nonslip slots may be provided on the outer surface of the quick connection handle 100 for anti slip.

The present invention provides the quick connection handle 100 which is convenient to assemble and disassemble, the spring of the locking component is connected to the end of the locking block having the internal thread, the button is connected to the other end of the locking block, the quick connection handle can be rapidly mounted on a photographic equipment or a screw bolt of a bowl during an installation of the handle via the cooperation of the locking block and the spring without pressing the button, and the handle can also be rapidly detached from a camera stand via the cooperation of the locking block, the spring and the button, such that it is more convenient for a user to operate the quick connection handle. Therefore, the structure according to the present invention is more reasonable, which is time saving and reduces effort when it is used to lock the bowl.

In summary, the above descriptions are only illustrative embodiments of the present invention, which are not intended to limit the scope of the present invention. That is, equivalent changes and modifications made according to the contents of the present disclosure should also be within the scope of the present invention.

What is claimed is:

1. A quick connection handle for photographic equipment, comprising:
    a mounting base;
    a locking component provided in the mounting base; and
    a connecting base connected to the mounting base;
    wherein the locking component is movable in the mounting base, a through hole is provided in a center of the mounting base through which a screw bolt having an external thread passes, the locking component comprises a locking block, a spring abutting against the locking block and a button, the locking block is limited in the mounting base to allow the locking component not to separate from the mounting base when the screw bolt passes or does not passes though the through hole, and the spring is configured to urge the locking block towards a first direction and the button is configured to urge the locking block towards a second direction opposite to the first direction, a locking chamber is provided in the locking block communicating with the through hole of the mounting base, and the locking chamber comprises an internal thread section and a non-threaded section which locate at opposite sides, and the spring abuts against an end of the locking block adjacent to the internal thread section, and
    after a connection is achieved by pushing the quick connection handle onto the screw bolt, the quick connection handle is rotated to lock a bowl of the photographic equipment between the quick connection handle and the screw bolt, and lock the quick connection handle and the screw bolt with each other.

2. The quick connection handle for photographic equipment according to claim 1, wherein a cross-section of the locking chamber transverse to its extending direction is substantial D shaped.

3. The quick connection handle for photographic equipment according to claim 1, wherein an inner diameter of the internal thread section is less than a width of the non-threaded section measured in a direction transverse to an extending direction of the locking chamber.

4. The quick connection handle for photographic equipment according to claim 1, wherein axes of the locking block, the spring and the button are substantially parallel to each other.

5. The quick connection handle for photographic equipment according to claim 1, wherein a height of the thread of the internal thread section gradually decreases to the non-threaded section.

6. The quick connection handle for photographic equipment according to claim 1, wherein a side wall of the internal thread section is arc-shaped with a central angle not more than 180°.

7. The quick connection handle for photographic equipment according to claim 1, wherein the mounting base comprises a first limit portion for accommodating the locking block, a second limit portion for receiving the button and a third limit portion for installing the spring.

8. The quick connection handle for photographic equipment according to claim 1, wherein the locking block is provided with a receiving groove at one end for receiving the spring.

9. The quick connection handle for photographic equipment according to claim 1, wherein the locking block is provided with a fixing portion at one side for fastening the button.

10. A photographic equipment assembly, comprising:
a camera stand comprising a bowl base;
the bowl placed on the bowl base; and
a quick connection handle according to claim 1.

11. The quick connection handle for photographic equipment according to claim 1, wherein the quick connection handle is rotated to disengage a locking between the quick connection handle and the screw bolt, and then the button is pressed to release the quick connection handle from the screw bolt.

12. The quick connection handle for photographic equipment according to claim 1, wherein the quick connection handle comprises a handle portion which is hollow.

13. The quick connection handle for photographic equipment according to claim 1, wherein the quick connection handle can be pushed onto the screw bolt to achieve the connection under pressing the button.

14. The quick connection handle for photographic equipment according to claim 1, wherein the quick connection handle can be pushed onto the screw bolt to achieve the connection without pressing the button.

\* \* \* \* \*